United States Patent [19]

Setogawa

[11] Patent Number: 5,504,522

[45] Date of Patent: Apr. 2, 1996

[54] AUDIO AND VIDEO SIGNAL MONITOR APPARATUS

[75] Inventor: Toshiaki Setogawa, Kanagawa, Japan

[73] Assignee: Sony Corporation, Tokyo, Japan

[21] Appl. No.: 495,957

[22] Filed: Jun. 28, 1995

Related U.S. Application Data

[63] Continuation of Ser. No. 275,459, Jul. 15, 1994, abandoned.

[30] Foreign Application Priority Data

Jul. 21, 1993 [JP] Japan .................................. 5-180329

[51] Int. Cl.⁶ .................................................. H04N 5/445
[52] U.S. Cl. ............................ 348/185; 348/563; 348/564
[58] Field of Search ..................................... 345/113, 133, 345/134; 348/185, 563, 564, 565, 569, 553, 578, 739, 184, 738; H04N 5/445

[56] References Cited

U.S. PATENT DOCUMENTS

4,149,189  4/1979  Nagai ........................................ 348/185
4,685,065  8/1987  Braun et al. ........................... 348/185 X
4,723,162  2/1988  Hamering ................................ 348/185
4,837,623  6/1989  Motoyama ........................... 348/569 X Primary Examiner—Victor R. Kostak
Attorney, Agent, or Firm—Ronald P. Kananen

[57] ABSTRACT

A signal monitor apparatus displays an envelope image of an audio signal together with an image of a related video signal on a picture screen of a monitor. When applied to a system including a plurality of signal sources and corresponding systems, the signal monitor apparatus can monitor the whole system as a whole and therefore the operator can reliably monitor abnormalities, such as a wire break or other trouble. This signal monitor apparatus comprises signal sources, an A/D converter (14) for converting audio signals from the signal sources into digital signals, a decimation filter (15) and a rounder (16) for compressing timebases of the outputs from the A/D converter (14), a data converter (17), a RAM (18), a timing controller (19) and a video circuit (21) for converting the compressed outputs into video signals, a video mixer (23) for mixing original video signals and the converted audio signal converted into a video signal and a monitor (24) for displaying a mixed output.

18 Claims, 6 Drawing Sheets

AUDIO AND VIDEO SIGNAL MONITOR APPARATUS

This application is a continuation of application Ser. No. 08/275,459, filed Jul. 15, 1994, now abandoned.

BACKGROUND OF THE INVENTION

1. Field of the Invention

The present invention relates to a signal monitor apparatus for use in a video and audio transmission system or the like used in a broadcasting station, for example.

2. Description of the Related Art

Figure 1:
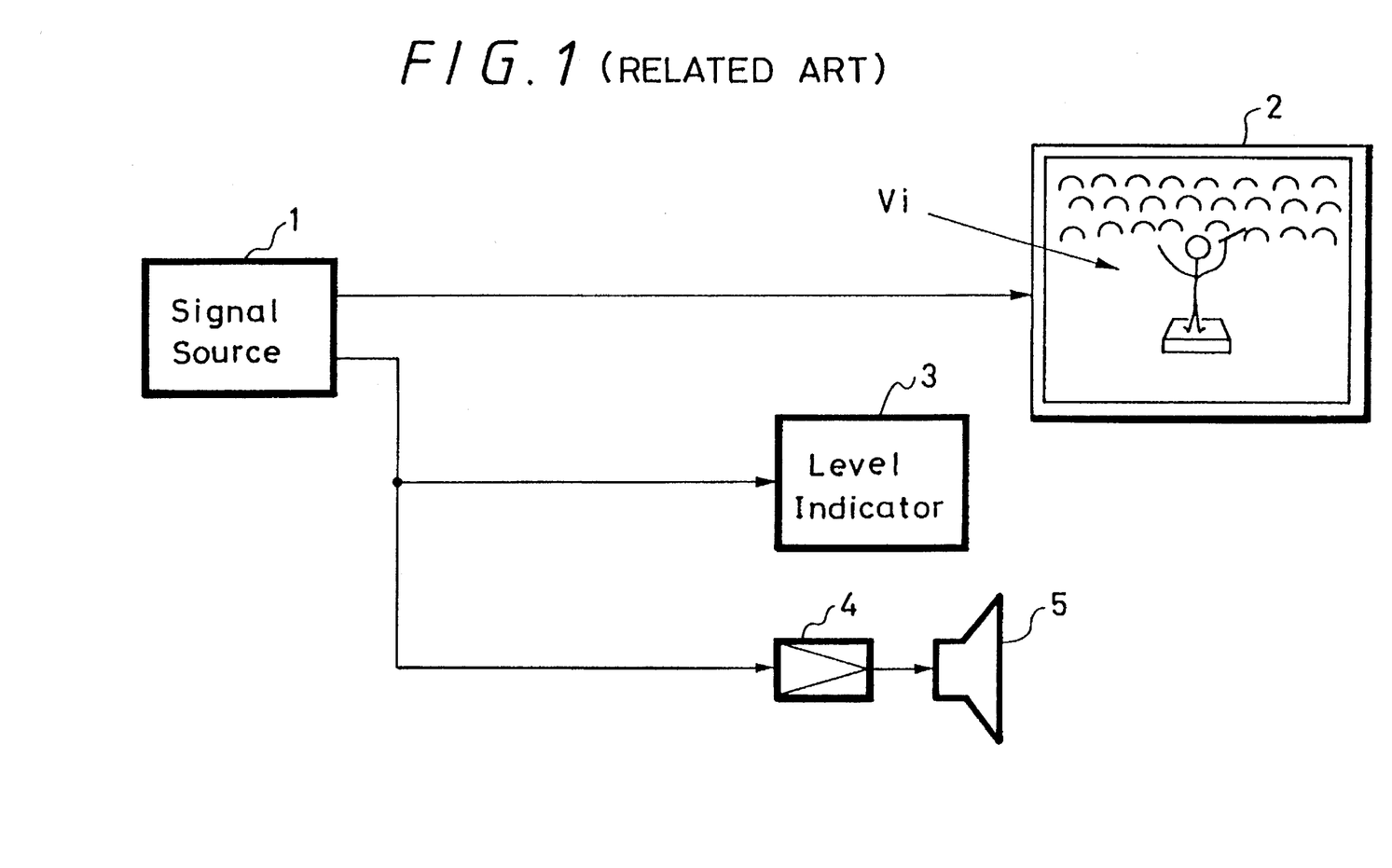
FIG. 1 is a schematic block diagram showing an example of a signal monitor apparatus according to the related art.

FIG. 1 of the accompanying drawings shows an example of a signal monitor apparatus for use in a video and audio transmission system used in a broadcasting station or the like.

In the signal monitor apparatus shown in FIG. 1, a video signal from a video and audio signal source 1 is supplied to a monitor (television monitor) 2 and displayed on a picture screen of the monitor 2 as an image Vi. An audio signal from the signal source 1 is supplied through an amplifier 4 to a speaker 5, from which it is emanated as sounds. The level of the audio signal also is indicated by a level indicator (analog meter) 3.

Broadcasting stations include a plurality of such systems (e.g., main system, sub system and Telop system) and a transmission system for effecting a television broadcasting, thereby forming the transmission system. The level indicator 3 and the speaker 5 are used in the transmission system in order to determine the presence or absence of an abnormality, such as a breaking of wire and a trouble. It is customary that a main system (i.e., system having a main signal source) and a system having a signal source for a Telop (message, such as "WAIT A MINUTE, PLEASE") are used as broadcasting systems. The operator monitors the level indication of the level indicator 3 and the output of the speaker 5. If it is determined by the operator that an abnormality, such as a breaking of wire and a trouble, occurred, then the operator can select a sub system (i.e., system having a sub signal source which generates a signal of the same content as that of the signal supplied from the main signal source). Therefore, even when a wire breaks or trouble occurs in the main system during broadcasting, it is possible to prevent the accident from affecting the broadcast by using the sub system immediately.

If it is determined by the level indicator 3 or the speaker 5 whether or not a breaking of wire or a trouble occurred in the system, then the following serious troubles arise.

It is difficult for the operator to determine on the basis of sounds emanated from the speaker 5 whether or not an abnormality, such as a breaking of wire or a trouble has occurred, as it is substantially impossible for the operator to determine the occurrence of a break or other trouble because the operator cannot tell one sound from other sounds produced from a plurality of speakers used in a plurality of systems at the same place operating at the same time.

Further, it is difficult for the operator to determine by visually confirming the state of the level indicator 3 whether or not an abnormality, such as a wire break or other trouble has occurred, as it is substantially impossible for the operator to determine the occurrence of a wire break or other trouble because the operator must watch a plurality of level indicators at the same place at the same time. By way of example, the operator can watch one or two level indicators at the same place at the same time but cannot watch five systems, i.e., five level indicators simultaneously. Furthermore, since the level indicator indicates the level in a real time fashion, it is substantially impossible for the operator to presume the contents on the basis of index deflection (i.e., index deflection in the case of a meter using an index and the number of photo-diodes in the case of a meter using a plurality of LEDs (light emitting diodes)).

To solve the aforesaid problems, it is proposed that the operator listens to sounds of the speaker of every system or to watch the level indicator of every system by switching the systems one by one with some suitable means, such as a switcher or the like. In this case, the operator should constantly switch the switcher and cannot monitor the all systems simultaneously. If the operator does not monitor all the systems simultaneously, the operator can not monitor systems other than the present system. Furthermore, if the operator switches the system with the switcher, then the operator suffers from increased cumbersome work.

Specifically, it is very difficult for the operator to monitor the system by using the level indicator or the speaker. Also, the operator cannot monitor a plurality of systems at the same time. Furthermore, if the operator intends to monitor the system by switching a plurality of systems with the switcher, then the operator's work becomes cumbersome and complicated.

SUMMARY OF THE INVENTION

In view of the aforesaid aspect, it is an object of the present invention to provide a signal monitor apparatus in which a plurality of systems be reliably and easily monitored.

According to an aspect of the present invention, there is provided a signal monitor apparatus comprising a sampling means (14) for receiving an audio signal supplied from a video and audio signal source and for sampling the audio signal, a timebase compression means (15) for compressing a timebase of the sampled audio signal output from the sampling means (14), a video signal means (17, 18, 19, 21) for converting an output signal output from the timebase compressing means (15) into a video signal, a mixing means (23) for mixing a signal output from the video signal means (17, 18, 19, 21) and a video signal supplied thereto from the video and audio signal source, and a display means (24) for displaying a mixed output output from the mixing means (23).

DETAILED DESCRIPTION OF THE PREFERRED EMBODIMENTS

The present invention will now be described in detail with reference to the accompanying drawings.

Figure 2:
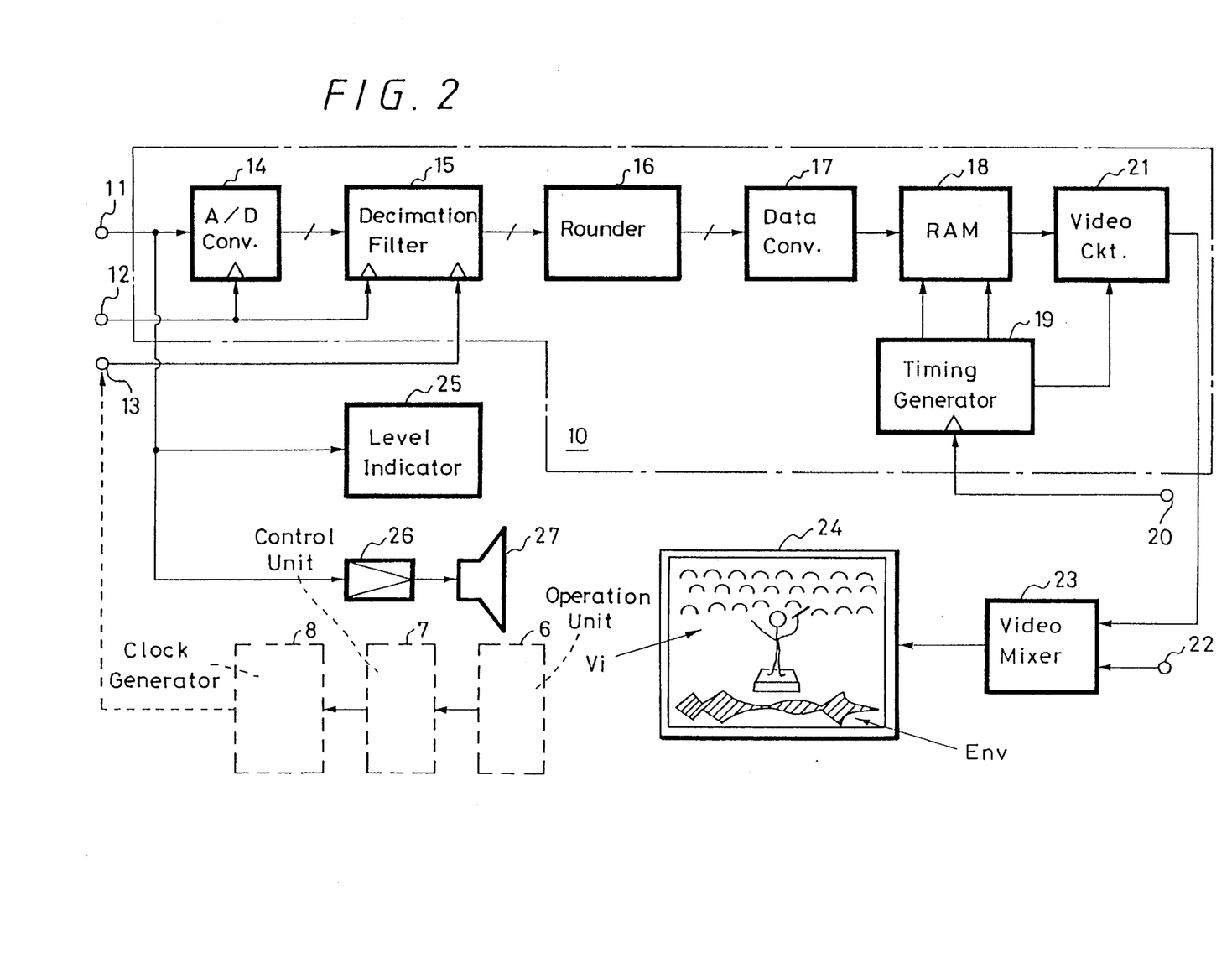
FIG. 2 is a schematic block diagram showing a part of a signal monitor apparatus according to a first embodiment of the present invention.

FIG. 2 is a schematic block diagram showing an arrangement of a signal monitor apparatus according to a first embodiment of the present invention. As shown in FIG. 2, an audio signal from a signal source (e.g., VTR (video tape recorder), disc driver, camera, reception system, etc.), not shown, is supplied to an input terminal 11. A sampling clock signal (e.g., 48 kHz) from a clock signal generating source (e.g., transmission system, timing generator, etc.) is supplied to an input terminal 12. A decimation clock signal (e.g., 48 kHz/75=640 Hz) is supplied to an input terminal 13.

An analog-to-digital (A/D) converter 14 converts an analog audio signal (stereophonic or monaural audio signal) supplied thereto from a signal source (not shown) through the input terminal 11 into 16-bit digital audio data with frequency of 48 kHz in response to the sampling clock signal supplied thereto through the input terminal 12 from the clock signal generating source (not shown). The digital audio data from the A/D converter 14 is supplied to a filter (decimation filter) 15.

The decimation filter 15 decimates the digital audio data with a decimation ratio of 75:1 on the basis of the sampling clock signal supplied thereto through the input terminal 12 and the decimation clock signal supplied thereto through the input terminal 13.

Figure 3:
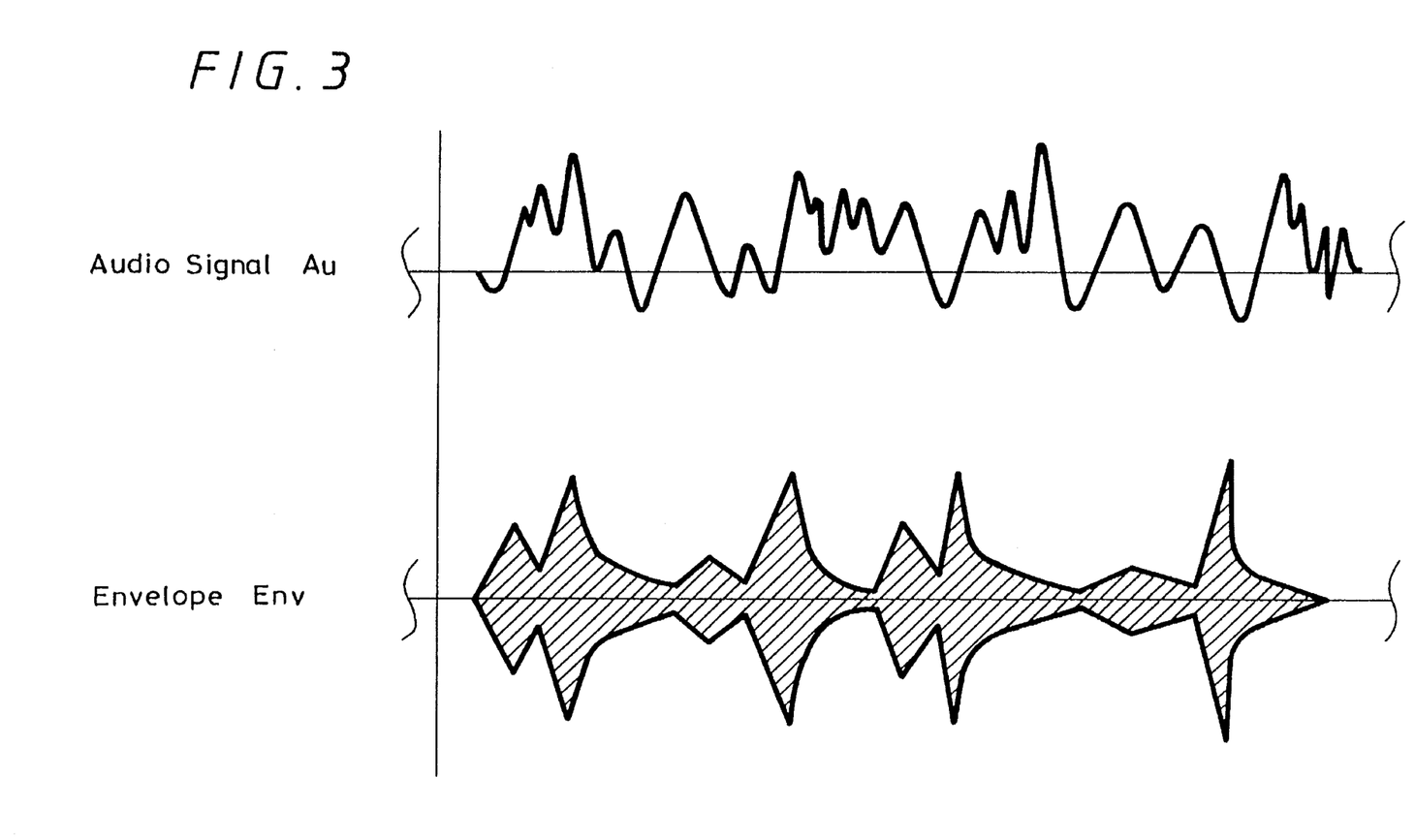
FIG. 3 is a diagram of waveforms of an audio signal and an envelope.

According to this embodiment, an audio signal is compressed and envelope waveform data is obtained from the compressed signal as image data. Then, the resultant envelope waveform data is displayed on a monitor 24, which will be described later on, together with an image based on a video signal. Specifically, as shown in FIG. 3, an audio signal Au supplied through the input terminal 11 is converted into an image based on an envelope Env of the audio signal as an image signal by a variety of processing which will be described below and the image based on the envelope Env is displayed on the monitor 24 together with an image based on the video signal.

When a video signal in which an audio signal of one second is expressed with 640 dots in the lateral direction is obtained, a data rate becomes 649 Hz. Therefore, a timebase compression ratio in the decimation filter 15 is expressed as 48000:640=75:1. Specifically, the digital audio data is decimated by the decimation filter 15 from the 16-bit digital signal with the frequency of 48 kHz into a 16-bit digital signal with a frequency of 640 Hz.

Figure 4:
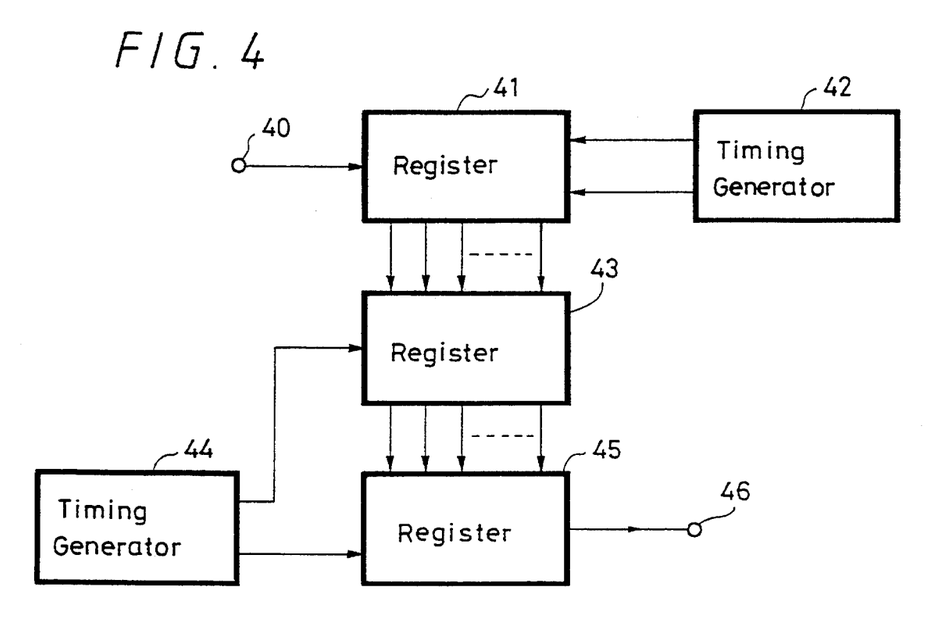
FIG. 4 is a schematic block diagram showing an example of a part of the signal monitor apparatus according to the present invention.

FIG. 4 shows an example of the arrangement of this decimation filter 15. The arrangement shown in FIG. 4 is what might be called a double-buffer. As shown in FIG. 4, the digital audio data from the A/D converter 14 shown in FIG. 2 is supplied to an input terminal 40 and the digital audio data from the A/D converter 14 is supplied to a register 41 through the input terminal 40.

The register 41 transfers data stored therein to a register 43 in parallel on the basis of a clock signal and a control signal (control signal used to transfer data stored in the next register 43) from a timing generator 42. The register 43 is a parallel register which transfers parallel data from the register 41 to the next register 45 in parallel on the basis of a control signal from a timing generator 44.

The register 45 outputs data transferred thereto from the register 43 from an output terminal 46 bit by bit serially on the basis of the clock signal (bit clock) from the timing generator 44.

According to the arrangement shown in FIG. 4, since the register 41 transfers data to the register 43 on the basis of the control signal from the timing generator 42, it is possible to vary the amount of data output from the register 45 per unit time by varying the transfer period.

Referring back to FIG. 2, the output of the decimation filter 15 is supplied to a rounder 16. The rounder 16 converts the digital audio data compressed with the compression ratio of 75:1 from the decimation filter 15 into data of bits that can be displayed on the monitor 24 by rounding off the data. If the size of the longitudinal direction defined when the digital audio data is displayed on the picture screen of the monitor 24 is 64 bits, then it is sufficient that information expressed by 2's complement of 5 bits is used. Accordingly, the rounder 16 converts the 16-bit digital audio data of 640 Hz into 5-bit digital audio data of 640 Hz by rounding off the data. The 5-bit digital audio signal of 640 Hz is supplied to a data converter 17.

Figure 5:
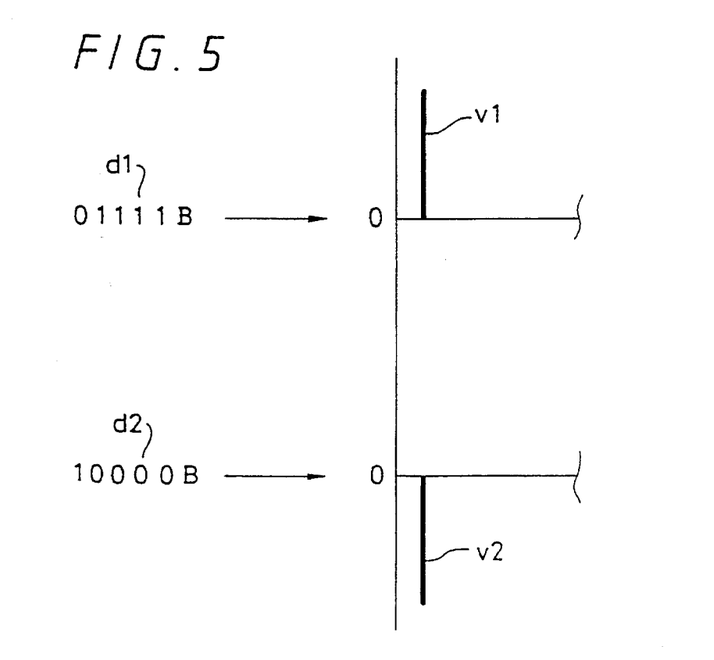
FIG. 5 is a diagram used to explain a mapping implemented when digital audio data is converted into image data.

The data converter 17 converts the digital audio data, i.e., PCM (pulse code modulated) codes supplied thereto from the rounder 16 into bar-shaped image data. This will be described more fully with reference to FIG. 5. In FIG. 5, reference symbols d1 and d2 depict digital audio data, respectively, and reference symbols v1 and v2 depict image data (bar-shaped image data), respectively. Further, the code, i.e., digital audio data d1 ("01111B") is a positive code and the digital audio data d2 ("10000B") is a negative code.

As will be clear from FIG. 5, since the digital audio data d1 from the rounder 16 is the positive code, the data converter 17 outputs the image data v1 mapped so as to be upwardly displayed with reference to "0" (e.g., position of "0" on the image) shown in FIG. 5. Also, since the digital audio data d2 is the negative code, the data converter 17 outputs the image data v2 mapped so as to be downwardly displayed with reference to "0" (e.g., position of "0" on the image) shown in FIG. 5. Incidentally, the image data v1 and v2 are pixel data, respectively.

Referring back to FIG. 2, the output of the data converter 17 is supplied to a RAM (DRAM: dynamic RAM or SRAM (static RAM): VRAM formed of static RAM or the like: video RAM) 18. The RAM 18 memorizes pixel data from the data converter 17 in response to a write control signal supplied thereto from a timing controller 19 and outputs memorized pixel data in response to a read control signal supplied thereto from the timing controller 19. The pixel data thus read out from the RAM 18 is supplied to a video circuit 21.

The timing controller 19 generates write and read control signals on the basis of an external synchronizing video reference signal generated from a circuit which synchronizes the whole system (e.g., transmission system), such as a timing generator or an equipment through the input terminal 20. The timing controller 19 supplies the write and read control signals thus generated to the RAM 18 and obtains horizontal and vertical synchronizing signals (or external horizontal and vertical synchronizing signals). The horizontal and vertical synchronizing signals from the timing controller 19 are supplied to the video circuit 21.

The timing controller 19 supplies the read and write control signals to the RAM 18 at such timing that, if the audio signal is displayed in the form of 640 dots in the lateral direction and 64 dots in the longitudinal direction, then the write control signal is made active until pixel data from the data converter 17 is 640 dots×64 dots and the read control signal is made active after the pixel data was presented in the form of 640 dots×64 dots. Incidentally, if the RAM 18 is formed of an FIFO (first-in first-out) memory, the read-out timing is delayed from the write timing.

The video circuit 21 establishes a matching by repeatedly outputting pixel data (640×64 pixels) of one image from the RAM 18 30 times on the basis of the horizontal and vertical synchronizing signals supplied thereto from the timing controller 19 because the picture of the NTSC system becomes 30 frames/second.

The output from the video circuit 21, i.e., the video signal which results from outputting the same image data 30 times per second, i.e., video signal of 30 images/second is supplied to a video mixer 23. The video mixer 23 mixes the video signal (image data of 640 dots×64 dots of 30 images/second) from the video circuit 21 and a video signal (image data Vi displayed on the monitor 24 shown in FIG. 2) supplied thereto from a signal generating source (not shown), and supplies a mixed video signal to the monitor (television monitor) 24.

Therefore, on the picture screen of the monitor 24 are displayed the image Vi of the video signal from the signal source, not shown, and an image Env in which the audio signal of one second is converted into the envelope image.

FIG. 2 shows the case that the level indicator 25, the amplifier 26 and the speaker 27 also are provided. In this case, the level is indicated by the level indicator 25 together with the image Vi and the envelope image Env of the audio signal associated with (or simultaneously recorded) the image Vi displayed on the picture screen of the monitor 24. Further, a sound is emanated from the speaker 27. If only a breaking of wire is to be checked, then the level indicator 25, the amplifier 26 and the speaker 27 need not be provided.

While the audio signal of one second is compressed and displayed on the monitor 24 as described above, the present invention is not limited thereto and an operation unit (e.g., keyboard, button, mouse, track-ball, etc.) shown by a dashed block 6 for instructing a duration (or frames) of a compressed audio signal to be displayed may be provided in order to instruct that an audio signal of a certain duration can be displayed as an image. In this case, when a command is issued by operating the operation unit 6, a control circuit shown by a dashed block 7 selects the frequency of the decimation clock signal generated from a clock generator shown by a dashed block 8, and the selected decimation clock signal is supplied through the input terminal 13 to the decimation filter 15 so that a compression ratio in the decimation filter 15 can be varied.

If the clock generator 8 is formed of a frequency divider which obtains different decimation clock signals with a plurality of frequencies by dividing a reference decimation clock signal, for example, or the clock generator 8 is formed of a selector circuit which selects different decimation clock signals with a plurality of frequencies on the basis of input data indicative of the duration of the audio signal, then the clock generator 8 can be simplified in arrangement. Moreover, the clock generator 8 might be a combination of a voltage generator which generates a corresponding voltage on the basis of input data indicative of the duration of the audio signal and a VCO (voltage controlled oscillator) which generates a decimation clock signal based on the voltage supplied thereto from this voltage generator.

As earlier noted, during the time when the video circuit 21 reads pixel data of one picture formed of 640×64 dots 30 times per second, pixel data of the next one picture formed of 640×64 dots is supplied from the data converter 17 to the RAM 18. Similarly, the audio signal associated with the video signal supplied from the signal source or the audio signal recorded together with the video signal is sequentially compressed and then converted into image data, whereafter it is read out 30 times per second.

Therefore, the monitor 24 keeps displaying on its display screen the image Vi of the video signal supplied thereto from the signal source and the envelope image Env of the audio signal near the image Vi so that the operator can determine by visually confirming the displayed images on the picture screen of the monitor 24 whether or not a wire break occured. Moreover, the operator can determine whether or not the audio signal of the envelope image Env is the audio signal corresponding to the image Vi of the video signal from the signal source.

The present example of the image displayed on the picture screen of the monitor 24 shows a scene in which a leader conducts a chorus. When a so-called environmental video image or the like is made, a certain picture and sounds that are not related to this picture, are recorded. Except for such examples of an environmental video image, the songs of the chorus singers conducted by the leader are output in synchronism with the image Vi in which the leader conducts the chorus in the example shown in FIG. 2.

Accordingly, if the envelope image Env is not displayed at all or hardly displayed even though songs of the chorus singers conducted by the leader are output in the image Vi, it is possible for the operator to clearly understand that the audio signal is not supplied due to an abnormality, such as a wire break or other circuit trouble. Moreover, those who are specialized in audio signal can recognize not only the breaking of a wire, but also a trouble of a circuit system or a signal attenuation on the basis of the envelope and the envelope image Env predicted from the state (e.g., when one of chorus singers sings or all chorus signers sing) of the chorus singers conducted by the leader shown in the image Vi.

Operation of the signal monitor apparatus shown in FIG. 2 will now be described more in detail.

As shown in FIG. 2, the audio signal supplied through the input terminal 11 from the signal source (not shown) is converted by the A/D converter 14 to 16-bit digital audio data of 48 kHz and then supplied to the decimation filter 15, in which it is decimated with a decimation ratio of 75:1, thereby being converted into 16-bit digital audio data of 640 Hz, for example.

The digital audio data from the decimation filter 15 is supplied to the rounder 16, in which it is converted into 5-bit digital audio data of 640 Hz and then fed to the data converter 17. The data thus supplied to the data converter 17 is processed by mapping as shown in FIG. 5 and converted into pixel data (envelope image data) of 640×64 dots, for example, whereafter it is written in the RAM 18.

When data of one picture (640×64 dots) are written in the RAM 18, pixel data of one image that was read out from the RAM 18 by the read control signal from the timing controller 19 is supplied to the video circuit 21 from which the NTSC data, for example is continuously output 30 times per second on the basis of horizontal and vertical synchronizing signals supplied thereto from the timing controller 19 and then supplied to the video mixer 23 as a video signal.

The video signal supplied to the video mixer 23 is mixed with a video signal supplied from a signal source, not shown, and supplied to the monitor 24, thereby being displayed on the picture screen of the monitor 24 as an image.

As described above, according to the first embodiment of the present invention, since the audio signal is converted into the envelope image and displayed on the picture screen of the monitor 24 together with the image of the related video signal, when the signal monitor apparatus according to the present invention is applied to the system including a plurality of systems shown in FIG. 2, i.e., the system which includes a plurality of signal sources and a plurality of systems corresponding to the signal sources, the operator can monitor the entire system. Thus, it is possible for the operator to reliably monitor an abnormality, such as a breaking of wire or the like. Further, since the envelope image is displayed on the picture screen of the monitor, it is possible for the operator to assume and monitor the entire program content on the basis of the envelope waveform. Thus, the system that is easy for the operator to handle can be provided and the audio signal can be monitored reliably with ease.

Furthermore, since the compression ratio of the decimation filter 15 can automatically be varied by selecting (or generating) the decimation clock signal on the basis of an instruction issued when a duration of audio signal displayed as an image is determined, the setting matched with the operation done by the operator can be made with ease, whereby the operator can satisfactorily carry out a desired processing.

While the audio signal of one second is converted to the envelope image and displayed as an image as described above, the present invention is not limited thereto and an envelope image of several 10s of seconds, for example, may be displayed as an image. In this case, it becomes necessary to vary the compression ratio of the decimation filter 15 on the basis of the duration of the audio signal to be displayed. Accordingly, the above-mentioned arrangement should additionally provided. In that case, since it is sufficient that the decimation clock signal is varied concurrently with the instruction that the duration of the audio signal to be displayed as an image is determined, the arrangement of the apparatus according to the present invention can be simplified considerably.

While the signal monitor apparatus according to the present invention is applied to the NTSC system as described above, the present invention is not limited thereto and can be applied to all sorts of systems, such as the PAL system, the SECAM system and the HDTV system. In this case, it is sufficient to set the number in which the video circuit 21 outputs the pixel data of one image in accordance with the number of frames per unit time of the television system. Further, similarly to the case that the compression ratio of the decimation filter 15 is set, it is sufficient to set the number in which the video circuit 21 automatically outputs pixel data by some suitable means, such as the keyboard, the mouse, the switch or the like on the basis of the type of the system, such as the NTSC system, the PAL system, the SECAM system and the HDTV system.

While the audio signal is decimated by the decimation filter 15 as described above, the present invention is not limited thereto and the audio signal may be expanded (enlarged), whereafter the expanded audio signal may be converted into the envelope image and displayed. With this arrangement, the operator can monitor only the points narrowed to the operator's attention.

While it is determined by visually confirming the audio signal converted into the image data whether or not the disconnection occurred as described above, the present invention is not limited thereto and, similarly as described above, it may be determined by visually confirming a video signal (from a signal source), for example, converted into the envelope image whether or not a breaking of wire occurred. Alternatively, it is possible to display a message representing a breaking of wire on the picture screen of the monitor. With this arrangement, the operator need not monitor a breaking of wire and the operator's work can be made easy. In order to automatically monitor a breaking of wire, positive and negative hold levels (very low levels) are set and a comparator is disposed ahead of the A/D converter 14 if the audio signal is the analog audio signal or the comparator is disposed behind the A/D converter 14 if the audio signal is the digital audio signal. Then, when it is determined by the comparator that neither of the positive and negative levels of the audio signal (or audio data) exceeds the threshold level during a predetermined period or longer, message data (image data) indicative of a breaking of wire that had been generated by some suitable means, such as a character generator, is supplied to the video mixer 23.

Figure 6:
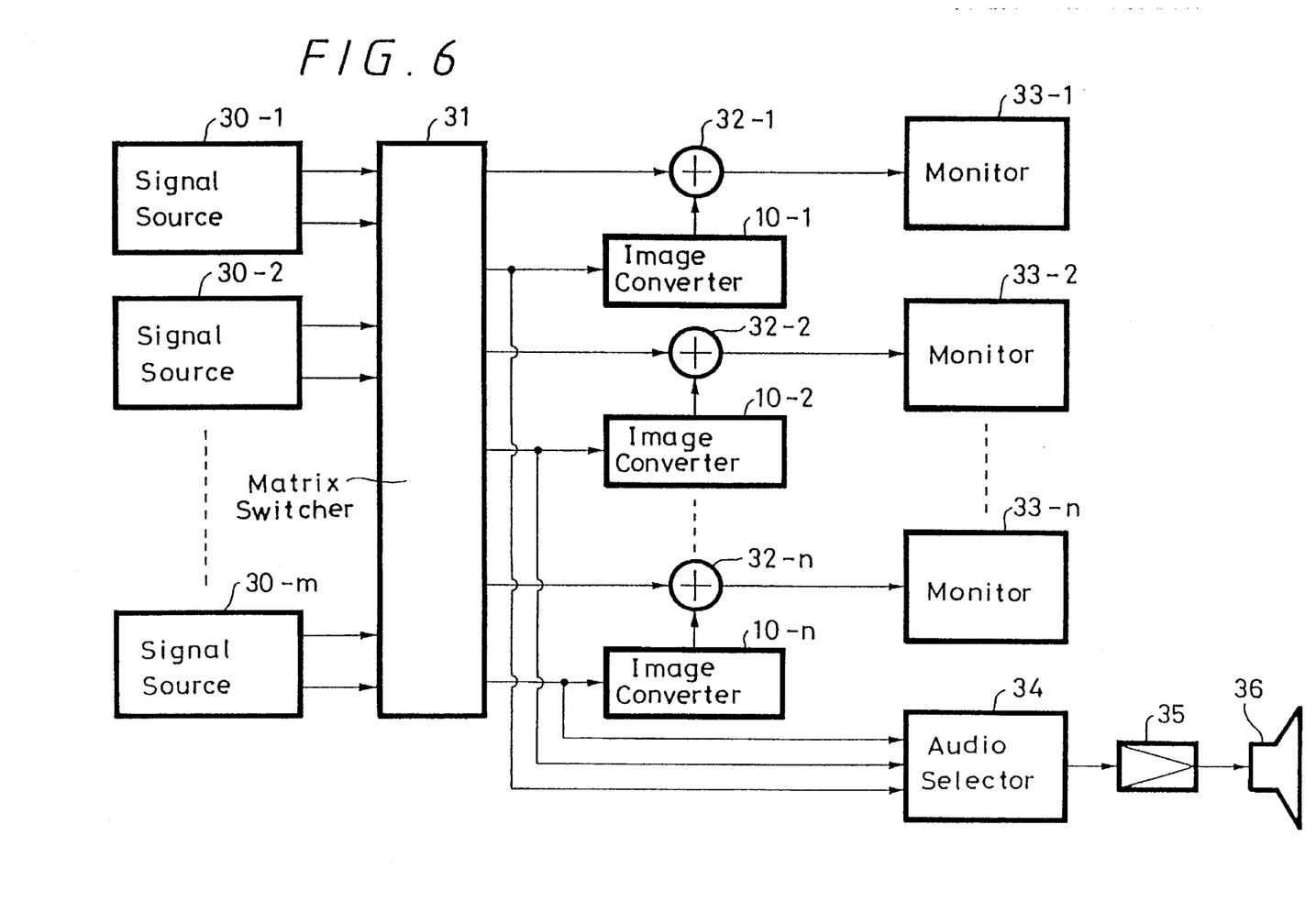
FIG. 6 is a schematic block diagram showing a signal monitor apparatus according to a second embodiment of the present invention.

The signal monitor apparatus according to a second embodiment of the present invention will be described below with reference to FIG. 6. Image converters 10-1, 10-2, . . . , 10-n shown in FIG. 6 are the same as the image converter 10 shown in FIG. 2 and therefore need not be described in detail. According to the second embodiment, as shown in FIG. 6, there are provided m signal sources, i.e., signal sources 30-1, 30-2, . . . , 30-m which are switched by a matrix switcher 31 (matrix switchers may be separately provided in association with audio and video signal sources). Audio signals output from the matrix switcher 31 are selected by an audio selector 34. The audio signal selected by the audio selector 34 is supplied through an amplifier 35 to a speaker 36 and thereby emanated as sounds. There are provided n adders, i.e., adders 32-1, 32-2, . . . , 32-n and n image converters, i.e., image converters 10-1, 10-2, . . . , 10-n. Similarly as described above, video and audio signals from the signal sources 30-1, 30-2, . . . , 30-n are converted into envelope image data and video signals are mixed by the adders 32-1, 32-2, . . . , 32-n and the image converters 10-1, 10-2, . . . , 10-n. Then, video signals that had been obtained by the additions in the adders 32-1, 32-2, . . . , 32-n are supplied to and displayed by n monitors, i.e., monitors 33-1, 33-2, . . . , 33-n as images, respectively.

The input of the external synchronizing video signal, which is supplied to the video mixer 23 shown in FIG. 2, to the adders 32-1, 32-2, .., 32-n need not be described herein. Moreover, the image converters 10-1, 10-2, . . . , 10-n were earlier described with reference to FIG. 2 and therefore operations thereof need not be described herein.

Video and audio signals from the signal sources (e.g., VTR, optical disc, magnetic disc, video camera, microphone, etc.) 30-1, 30-2, . . . , 30-m are supplied to the matrix switcher 31 and distributed by the matrix switcher 31 into a plurality of video signal output terminals and a plurality of audio signal output terminals.

The video signals are respectively supplied to the adders 32-1, 32-2, .., 32-n, and the audio signals are respectively supplied from a pair of output terminals (not limited to a pair of output terminals) to the image converters 10-1, 10-2, . . . , 10-n and then selected by the audio selector 34, whereafter they are supplied through the amplifier 35 to the speaker 36, thereby being emanated as sounds.

The audio signals that had been processed by the image converters 10-1, 10-2, . . . , 10-n similarly to FIG. 2 as final envelope images are respectively supplied to the adders 32-1, 32-2, . . . , 32-n as video signals.

The adders 32-1, 32-2, . . . , 32-n add the video signals supplied thereto from the signal sources 30-1, 30-2, . . . , 30-m and the video signals (e.g., video signals which result from outputting the pixel data of image of 640×64 dots a plurality of times in accordance with the television system similarly as described above) which result from converting the audio signals from the signal sources 30-1, 30-2, . . . , 30-m into envelope images. Thereafter, the mixed signals are supplied to the monitors 33-1, 33-2, . . . , 33-n and the video signals are displayed on the picture screens of the monitors 33-1, 33-2, . . . , 33-n as images Vi similarly to the example of the monitor 24 shown in FIG. 2. Further, the envelopes of the audio signals relating to the video signals are displayed on the picture screens of the monitors 33-1, 33-2, . . . , 33-n as envelope images Env, respectively.

Therefore, similarly as described above, the operator can reliably monitor an entire plurality of audio signals with ease. If the duration of the audio signal to be displayed is not selected to be one second but selected to be several 10s of seconds, then the period during which the envelope image Env of the audio signal is changed is extended so that the operator can monitor the audio signal with sufficient time. Also in this case, the system is not limited to the television system similarly to FIG. 2 and not only the audio signal but also the video signal may be monitored. Furthermore, a breaking of wire may automatically be monitored and a message, such as a breaking of wire or the like may be displayed on the picture screen of the monitor.

Figure 7:
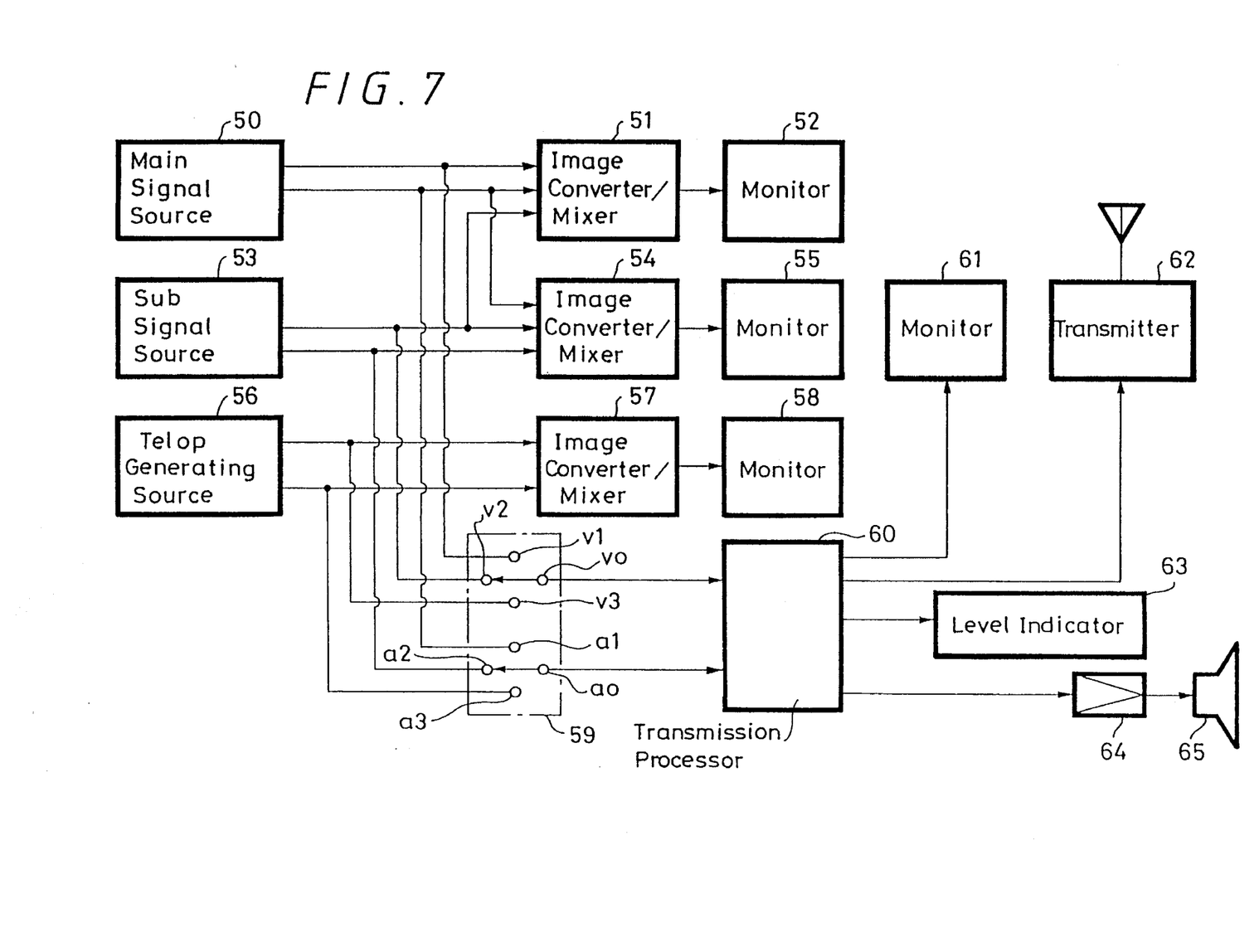
FIG. 7 is a schematic block diagram showing a signal monitor apparatus according to a third embodiment of the present invention.

FIG. 7 is a block diagram showing an arrangement of the signal monitor apparatus according to a third embodiment of the present invention. FIG. 7 shows the case where the signal monitor apparatus according to the present invention is applied to a transmission system used in broadcasting stations or the like.

Referring to FIG. 7, there is provided a main signal source 50, i.e., signal source used to output broadcasting video and audio signals. There is provided a sub signal source 53, i.e., signal source used to output the video and audio signals as those of the main signal source 50 when the main signal source 50 is disabled by a trouble, such as a breaking of wire or the like. A signal source (Telop generating source) 56 is adapted to output a Telop which announces a message "WAIT A MINUTE, PLEASE", for example.

Video converter/mixers 51, 54 and 57 are comprised of the adders 32-1, 32-2, . . . , 32-n and the image converters 10-1, 10-2, . . . , 10-n shown in FIG. 6. Although the external synchronizing signal supplied to the video mixer 23 shown in FIG. 2 is not shown, let it be assumed that the external synchronizing signal is supplied to the image converters 10-1, 10-2, . . . , 10-n, respectively.

Monitors 52, 55 and 58 are adapted to display the video signals from the image converter/mixers 51, 54 and 57 on their picture screens, respectively.

A transmission system switcher 59 is adapted to selectively output video and audio signals supplied thereto from the main signal source 50 and the sub signal source 53 or a video signal (only Telop) from the Telop generating source 56 in response to operation of an operation switch (not shown). Specifically, the video signal from the main signal source 50 is supplied to a video 1 fixed contact v1 of the switcher 59; the video signal from the sub signal source 53 is supplied to a video 2 fixed contact v2 of the switcher 59; and the video signal from the Telop generating source 56 is supplied to a video 3 fixed contact v3 of the switcher 59, respectively.

The audio signal from the main signal source 50 is supplied to an audio 1 fixed contact a1 of the switcher 59; the audio signal from the sub signal source 53 is supplied to an audio 2 fixed contact a2; and the audio signal from the Telop generating source 56 is supplied to an audio 3 fixed contact a3 of the switcher 59, respectively.

A video movable contact vo and an audio movable contact ao of the switcher 59 are changed in position in such an interlocking fashion as to connect the audio movable contact ao to the audio 1 fixed contact a1 when the video movable contact vo is connected to the video 1 fixed contact v1; to connect the audio movable contact ao to the audio 2 fixed contact a2 when the video movable contact vo is connected to the video 2 fixed contact v2; and to connect the audio movable contact ao to the audio 3 fixed contact a3 when the video movable contact vo is connected to the video 3 fixed contact v3.

The video signal selected by the switcher 59 is supplied through the transmission processor 60 to a monitor (television monitor) 61, thereby a present video signal to be transmitted being monitored. The audio signal, on the other hand, is supplied through an amplifier 64 to a speaker 65 and emanated from the speaker 65 as sounds. Also, the audio signal is supplied to a level indicator 63 and thereby the level of the audio signal is indicated on the level indicator 63.

The video and audio signals selected by the switcher 59 are processed by the transmission processor 60 in some suitable fashions, such as modulation or the like and then supplied to a transmitter 62 from which they are broadcast as a television signal.

According to the third embodiment shown in FIG. 7, since the image converter/mixers 51, 54 and 57 mix the video signals from the main signal source 50, the sub signal source 53 and the Telop generating source 56 with the video signals which result from converting the audio signals from the main signal source 50, the sub signal source 53 and the Telop generating source 56 similarly to FIGS. 2 and 6, the monitors 52, 55 and 58 display on their picture screens images of the video signals from the respective signal sources together with the envelope images which result from converting the audio signals to the envelope images similarly to the picture screen of the monitor 24 shown in FIG. 2. Therefore, the operator can monitor the states of the video and audio signals or a breaking of wire or the like by visually confirming the images displayed on the monitors 52, 55 and 58.

During the broadcasting, the video and audio signals from the main signal source 50 are selectively output by the switcher 59 and the video and audio signals from the main signal source 50 are supplied through the transmission processor 60 to the transmitter 62, from which they are broadcast.

During this period, the operator constantly monitors the images on the picture screens of the monitors 52, 55 and 58. If it is determined by the operator by watching the images based on the video and audio signals supplied thereto from the main signal source 50 that an abnormality, such as a breaking of wire or the like occurred, then the operator can supply the video and audio signals from the Telop generating source 56 through the transmission processor 60 to the transmitter 62 by switching the switcher 59 immediately or the operator can supply the video and audio signals from the sub signal source 53 which outputs the video and audio signals of the same contents as those of the video and audio signals of the main signal source 50 through the transmission processor 60 to the transmitter 62.

While the images based on the video and audio signals are not displayed on the monitor 61 unlike the monitors 52, 55 and 58 as described above, the present invention is not limited thereto and the video and audio signals selected by the switcher 59 may be processed by image converter/mixers separately provided similarly to the image converter/mixers 51, 54 and 57, whereby the video signal and the audio signal (envelope image), which are being broadcast, may be displayed on the monitor 61. According to this arrangement, it is possible for the operator to monitor an abnormality (e.g., breaking of wire, etc.) which occurs in a path extending from at least the main signal source 50, the sub signal source 53 and the Telop generating source 56 to the switcher 59.

According to the embodiments of the present invention, since the signal monitor apparatus shown in FIGS. 2 and 6 are applied to the transmission system used in the broadcasting station or the like, operator's work can be made easy and reliable. Moreover, the broadcasting itself can be improved in reliability. Furthermore, it is possible to prevent a broadcasting accident caused by a breaking of wire or the like from taking place.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An audio-video signal monitor apparatus, comprising:
   a sampling means for receiving an audio signal supplied from a video and audio signal source, for sampling said audio signal, and for generating a digital audio signal;
   a timebase compression means for receiving said digital audio signal and for compressing a timebase of said digital audio signal output from said sampling means so that a duration of each bit in said digital audio signal is varied from a first period of time to a second period of time;
   a video signal means for converting an output from said timebase compression means into a first video signal;
   a mixing means for mixing said first video signal output from said video signal means with a second video signal supplied thereto from said video and audio source; and
   a display means for receiving a mixed output from said mixing means and for displaying said mixed output comprised of said first video signal with said second video signal.

2. The apparatus as claimed in claim 1, wherein said video signal means includes a data converter for converting the signal output from said timebase compression means into pixel data, a memory in and from which said pixel data from said data converter is written and read out, and a timing control means for controlling a write timing and a read timing of said pixel data in and from said memory.

3. The apparatus according to claim 2, further comprising rounding means for rounding the output signal from said timebase compression means, and wherein a rounded signal is input to said data converter.

4. The apparatus according to claim 1, further comprising control means for controlling a compressing ratio in which said timebase compression means compresses said sampled output.

5. The apparatus as claimed in claim 2, wherein said data converter outputs pixel data for forming image data having a vertical length corresponding to a value indicated by input data.

6. The apparatus of claim 1, wherein said sampling means comprises an analog-to-digital converter.

7. The apparatus of claim 1, wherein said timebase compression means comprises:
   a first data register for receiving data comprising said digital audio signal in serial format from said sampling means and for transferring said data to a second data register at a timing controlled by a first timing generator;
   said second data register for transferring said data in parallel format to a third data register at a timing controlled by a second timing generator; and
   said third data register for transferring said data in serial format to said video signal means at said timing from said second timing generator.

8. The apparatus of claim 1, wherein said video signal means converts said output from said timebase compression means into said video signal with said video signal comprising an envelope signal of said audio signal.

9. The apparatus of claim 1, wherein said first period of time corresponds to a signal frequency of 48 kHz and said second period of time corresponds to a signal frequency of 640 Hz.

10. The apparatus of claim 3, wherein said rounding means converts said output signal from said timebase compression means from a 16 bit digital signal to a 5 bit digital signal.

11. The apparatus of claim 4, wherein said compressing ratio determines a duration of said audio signal which is displayed on said display means.

12. A system for monitoring a broadcasting station having a main signal source and a sub-signal source, comprising:
   a first image converter/mixer for receiving a main source audio signal and a main source video signal from said main signal source, for converting said main source audio signal into a first video signal, and for mixing said first video signal with said main source video signal to produce a first composite video signal;
   a second image converter/mixer for receiving a sub-signal source audio signal and a sub-signal source video signal from said sub-signal source, for converting said sub-signal source audio signal into a second video signal, and for mixing said second video signal with said sub-signal source video signal to produce a second composite video signal;
   means for displaying said first composite video signal so that said first video signal is overlaid onto said main source video signal and for displaying said second composite video signal so that said second video signal is overlaid onto said sub-signal source video signal; and
   means for switching an output of said broadcasting station between said main signal source and said sub-signal source;
   wherein contents of said main signal source audio signal and said sub-signal source audio signal can be monitored by viewing said displaying means.

13. The system of claim 12, wherein said displaying means comprises a first monitor for displaying said first composite video signal and a second monitor for displaying said second composite video signal.

14. The system of claim 12, wherein said broadcasting station further comprises a telop generating source and said system further comprises a third image converter/mixer for receiving a telop audio signal and a telop video signal from said telop generating source, for converting said telop audio signal into a third video signal, and for mixing said third video signal with said telop video signal to produce a third composite video signal, said displaying means displaying said third composite video signal.

15. The system of claim 12, further comprising a monitor for displaying said output of said broadcasting station, an audio speaker for generating acoustic signals of said output of said broadcasting station, and a level indicator for indicating a level of said acoustic signals.

16. A system for monitoring a plurality of signal sources, comprising:

an image converter, associated with each signal source, for receiving an audio signal from said signal source and for converting said audio signal into an audio representative video signal;

an adder, associated with each signal source, for mixing a video signal from said signal source with the audio representative video signal to produce a composite video signal; and means, associated with each signal source, for displaying said composite video signal so that said audio representative video signal is overlaid onto said video signal;

wherein said displaying means permits an operator to monitor contents of the audio signals associated with the plurality of signal sources simultaneously with the video signals associated with the plurality of signal sources.

17. The system of claim 16, further comprising a matrix switcher for receiving the audio and video signals from the plurality of signal sources, for supplying the video signals to the respective adders, and for supplying the audio signals to the respective image converters.

18. The system of claim 16, further comprising an audio selector for selecting one of the audio signals from said signal sources and a speaker for reproducing acoustic signals associated with said one audio signal.

* * * * *